United States Patent
Takeshima et al.

(10) Patent No.: US 6,906,002 B2
(45) Date of Patent: Jun. 14, 2005

(54) ABSORPTION REDUCTION-TYPE $NO_X$ PURIFYING CATALYST

(75) Inventors: Shinichi Takeshima, Susono (JP); Tetsuya Yamashita, Gotenba (JP); Toshiaki Tanaka, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/362,994

(22) PCT Filed: Aug. 1, 2001

(86) PCT No.: PCT/JP01/06634

§ 371 (c)(1), (2), (4) Date: Mar. 3, 2003

(87) PCT Pub. No.: WO02/20155

PCT Pub. Date: Mar. 14, 2002

(65) Prior Publication Data

US 2003/0181326 A1 Sep. 25, 2003

(30) Foreign Application Priority Data

Sep. 8, 2000 (JP) ........................ 2000-278679

(51) Int. Cl.$^7$ ........................ B01J 29/06; B01J 21/00; B01J 29/00; B01J 23/00; B01J 20/00
(52) U.S. Cl. ........................ 502/327; 502/66; 502/74; 502/261; 502/262; 502/263; 502/302; 502/303; 502/304; 502/308; 502/309; 502/313; 502/328; 502/332; 502/333; 502/334; 502/339; 502/341; 502/349; 502/350; 502/351; 502/355; 502/407; 502/415; 502/439
(58) Field of Search ........................ 502/74, 258–263, 502/302–304, 308, 309, 313, 327, 328, 330, 332, 333, 334, 339, 341, 349, 350–351, 355, 407, 415, 439

(56) References Cited

U.S. PATENT DOCUMENTS 5,212,142 A * 5/1993 Dettling ........................ 502/304
5,677,258 A * 10/1997 Kurokawa et al. ........................ 502/303

(Continued)

FOREIGN PATENT DOCUMENTS

EP 0 968 763 A1 1/2000
EP 0 982 066 A 3/2000

(Continued)

Primary Examiner—Cam N. Nguyen
(74) Attorney, Agent, or Firm—Oliff & Berridge, PLC

(57) ABSTRACT

A catalyst able to overcome defects of an absorption reduction-type $NO_x$ purifying catalyst, such as poor $NO_x$ purifying capability at low temperatures and low $SO_x$ desorbing property, is provided.

The catalyst is an absorption reduction-type $NO_x$ purifying catalyst where $NO_x$ absorbent particles and support particles having supported thereon a catalyst component are mixed. Preferably, acidic support particles are added to the support particle, the $NO_x$ absorbent particles are a metal oxide having a base point, and the metal oxide is rare earth-added zirconia. In conventional catalysts, the $NO_x$ absorbent such as alkali metal having strong basicity exposes the catalyst component present together on the same support to the basic condition to decrease the catalytic performance. However, in the present invention, the $NO_x$ absorbent and the support are separate particles, whereby the catalyst component can exert its original catalytic performance and, as a result, the $NO_x$ purifying capability at low temperatures and the $SO_x$ desorbing property are improved.

7 Claims, 3 Drawing Sheets

U.S. PATENT DOCUMENTS

| | | | |
|---|---|---|---|
| 5,681,788 A * | 10/1997 | Kanesaka et al. | 502/65 |
| 5,989,507 A * | 11/1999 | Sung et al. | 423/213.5 |
| 5,990,038 A * | 11/1999 | Suga et al. | 502/303 |
| 6,047,544 A * | 4/2000 | Yamamoto et al. | 60/285 |
| 6,093,378 A * | 7/2000 | Deeba et al. | 423/213.5 |
| 6,221,804 B1 * | 4/2001 | Yamada et al. | 502/326 |
| 6,228,799 B1 * | 5/2001 | Aubert et al. | 502/304 |
| 6,326,329 B1 * | 12/2001 | Nunan | 502/242 |
| 6,413,483 B1 * | 7/2002 | Brisley et al. | 423/239.1 |
| 6,420,306 B2 * | 7/2002 | Kurokawa et al. | 502/261 |
| 6,432,859 B1 * | 8/2002 | Iwakuni et al. | 502/66 |
| 6,503,862 B1 * | 1/2003 | Yamamoto | 502/65 |
| 6,518,213 B1 * | 2/2003 | Yamamoto et al. | 502/65 |
| 6,555,081 B2 * | 4/2003 | Hori et al. | 423/239.1 |

FOREIGN PATENT DOCUMENTS

| | | |
|---|---|---|
| EP | 0 988 890 A3 | 3/2000 |
| EP | 0 988 890 A2 | 3/2000 |
| EP | 1 013 334 A | 6/2000 |
| EP | 1 036 591 A | 9/2000 |
| EP | 1 052 008 A | 11/2000 |
| EP | 1 053 779 A | 11/2000 |
| JP | A 7-51544 | 2/1995 |
| JP | A 7-136514 | 5/1995 |
| JP | A 8-131838 | 5/1996 |
| JP | A 9-24247 | 1/1997 |
| JP | A 10-290931 | 11/1998 |
| JP | A 11-114422 | 4/1999 |
| JP | A 11-123331 | 5/1999 |
| JP | 11 151439 | 6/1999 |
| JP | 11 226404 | 8/1999 |
| JP | A 2000-202243 | 7/2000 |
| WO | WO 99/29417 A | 6/1999 |

* cited by examiner

ABSORPTION REDUCTION-TYPE $NO_x$ PURIFYING CATALYST

TECHNICAL FIELD

The present invention relates to an exhaust gas purifying catalyst for purifying an exhaust gas from an internal combustion engine of automobiles and the like and, more specifically, the present invention relates to an absorption reduction-type $NO_x$ purifying catalyst improved in a $NO_x$ purifying capability.

BACKGROUND ART

Recently, from the standpoint of global conservation, it is a worldwide problem to suppress the total amount of carbon dioxide ($CO_2$) exhausted from an internal combustion engine such as an automobile engine and the amount of nitrogen oxide ($NO_x$) generated. In order to solve this problem, a lean-burn engine has been developed for the purpose of improving the fuel consumption and an absorption reduction-type $NO_x$ purifying catalyst, obtained by adding a function of absorbing $NO_x$ in a lean atmosphere to a conventional three-way catalyst, has been developed for the purpose of purifying the exhaust gas of the lean-burn engine. These are making certain progress in solving the above-described problems.

In the lean-burn engine combined with the absorption reduction-type $NO_x$ purifying catalyst, the fuel is usually burned at an air-fuel ratio in the lean (oxygen-excess) condition and temporarily burned in a stoichiometric (at a theoretical air-fuel ratio) or rich (fuel-excess) condition.

HC (hydrocarbon) or CO in the exhaust gas is efficiently burned and removed in the lean condition by the action of catalyst due to the oxidative atmosphere. On the other hand, $NO_x$ is captured by an absorbent in the lean condition and this is temporarily released in the stoichiometric or rich condition and reduced and purified by the action of a catalyst due to the reducing atmosphere.

By virtue of these combustion conditions and the action of the absorption reduction-type $NO_x$ purifying catalyst, as a whole, the fuel consumption is improved and at the same time, HC, CO and $NO_x$ in the exhaust gas can be purified with good efficiency.

In this absorption reduction-type $NO_x$ purifying catalyst, a noble metal such as platinum, gold, palladium and rhodium is used as the catalyst component and a basic substance such as alkali metal (e.g., potassium, sodium) and alkaline earth metal (e.g., calcium, barium) is used as the $NO_x$ absorbent.

This lean-burn system established by combining the control of an air-fuel ratio and the $NO_x$ absorbent is successful to a certain extent in solving the problem to improve the fuel consumption and reduce the total generation amount of CO, HC and $NO_x$ as compared with the conventional exhaust gas purifying system using a three-way catalyst and a nearly theoretical air-fuel ratio.

The techniques on this absorption reduction-type $NO_x$ purifying catalyst are described in Japanese Unexamined Patent Publication (Kokai) Nos. 7-51544, 7-136514, 9-24247 and 11-14422, filed by the present applicant, or the like.

In any absorption reduction-type $NO_x$ purifying catalyst of these prior techniques, an alkaline earth metal is used as the $NO_x$ absorbent and the catalyst component such as platinum and the $NO_x$ absorbent both are supported on a support such as $\gamma$-alumina.

However, these absorption reduction-type $NO_x$ purifying catalysts of conventional techniques have a problem that the $NO_x$ purifying capability is poor when the exhaust gas temperature is low and about 300° C. or less. In addition, $SO_x$, of which source is sulfur contained in a slight amount, forms a salt with the $NO_x$ absorbent during the combustion and this $SO_x$ is not easily desorbed from the $NO_x$ absorbent. As a result, the $NO_x$ purifying capability disadvantageously decreases over time.

As such, conventional absorption reduction-type $NO_x$ purifying catalysts are in need of improvement in both the $NO_x$ purifying capability at low temperatures and the $SO_x$ desorbing property. Particularly, in order to apply the catalyst to a low-temperature exhaust gas containing a relatively large amount of $SO_x$, such as diesel engine exhaust gas, those capabilities must be greatly improved.

Accordingly, an object of the present invention is to provide a catalyst having a different structure from conventional techniques and thereby provide an exhaust gas purifying catalyst freed from the above-described problems and capable of exhibiting a high $NO_x$ purifying capability at low temperatures and an improved $SO_x$ desorbing property.

DISCLOSURE OF THE INVENTION

The object of the present invention can be attained by an absorption reduction-type $NO_x$ purifying catalyst where $NO_x$ absorbent particles and support particles having supported thereon a catalyst component are mixed.

More specifically, the exhaust gas purifying catalyst of the present invention is a catalyst where the $NO_x$ absorbent particles and the support particles having supported thereon a catalyst component are separate particles and these support particles and absorbent particles are mixed. $NO_x$ is preferably taken in by absorption to the surface or inside of the $NO_x$ absorbent particles, while keeping its chemical structure substantially in an intact state.

In the present invention, the $NO_x$ purifying capability at low temperatures and the $SO_x$ desorbing property are remarkably improved by using the support and the $NO_x$ absorbent as separate particles. The reasons therefor are thought to be as follows.

In conventional absorption reduction-type $NO_x$ purifying catalysts, the $NO_x$ absorbent is an alkali metal or an alkaline earth metal as described above and such a metal shows strong basicity. If the catalyst component and the $NO_x$ absorbent are present together on the same support, the $NO_x$ absorbent electrically acts on the catalyst component through the support and, as a result, the performance of the catalyst component is decreased.

Particularly, the catalyst component such as platinum decreases in the oxidizing capability of $NO \rightarrow NO_2$ and the HC oxidizing capability under the lean condition and, thereby, the capability of absorbing $NO_x$ at low temperatures and the HC purification percentage are decreased. Furthermore, the $NO_x$ purification percentage also does not increase at a high temperature.

On the other hand, when the $NO_x$ absorbent and the support are separate particles as in the present invention, the $NO_x$ absorbent does not electrically act on the catalyst component and, therefore, the catalyst component can exert its original catalyst performance, whereby the $NO_x$ purifying capability at low temperatures and the $SO_x$ desorbing property both are improved as compared with conventional catalysts using an $NO_x$ absorbent such as alkali metal.

Moreover, conventional $NO_x$ absorbents such as alkali metal absorb $NO_x$ or $SO_x$ in the form of a nitrate or a sulfate and sufficient absorption is attained when such a salt is formed even to the inside of the $NO_x$ absorbent particle, however, the speed at which the salt is formed even to the inside and the speed at which $NO_x$ or the like is released from the internally formed and firmly bonded salt are low and this gives rise to low efficiency in the absorption/release of $NO_x$ or the like.

On the other hand, in the present invention, the $NO_x$ absorbent is particles separate from the support and is not restricted by the amount of the absorbent supported on the support as in conventional $NO_x$ absorbents such as an alkali metal. Therefore, in the present invention, the $NO_x$ absorbent may be used in a relatively large amount so as to enable sufficient $NO_x$ purification even when $NO_x$ is absorbed only on the surface of the $NO_x$ absorbent or in the vicinity of the surface, or an absorbent for absorbing $NO_x$ or the like through relatively weak bonding may be used to overcome the low efficiency in the absorption/release of $NO_x$ or the like, whereby the $NO_x$ purifying capability at low temperatures and the $SO_x$ releasability can be improved.

BEST MODE FOR CARRYING OUT THE INVENTION

Figure 1:
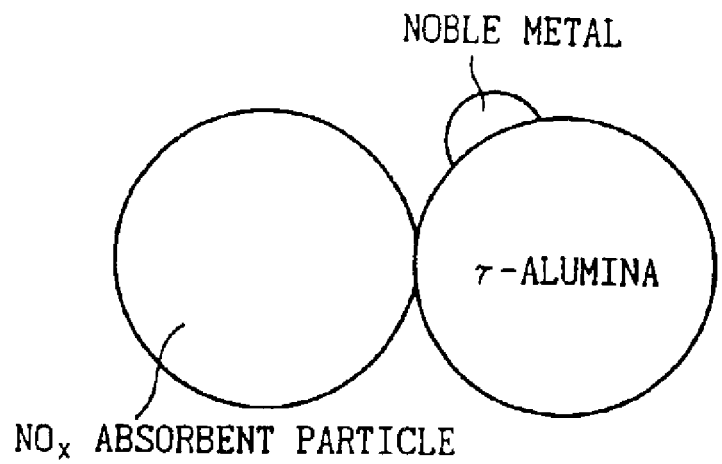
FIG. 1 is a model view showing one embodiment of the catalyst structure of the present invention.

The absorption reduction-type $NO_x$ purifying catalyst of the present invention is composed of $NO_x$ absorbent particles and support particles having supported thereon a catalyst component.

As the catalyst component, a noble metal such as platinum, gold, palladium and rhodium can be used.

As the $NO_x$ absorbent particles, particles which can take in mainly $NO_x$ between lattices or into vacancies or tunnels or which can absorb $NO_x$ on the surface or inside of the particles while substantially keeping the chemical structure intact, for example, by forming a solid solution with $NO_x$, can be used. Here, $NO_x$ may partially form a salt with the absorbent particle or the salt may dissolve in the $NO_x$ absorbent.

In a preferred embodiment, the $NO_x$ absorbent is a metal oxide having a base point for donating an electron, namely, a metal oxide for donating an electron to $NO_x$ to form a negative ion and capturing $NO_x$ by the electrical action between the negative ion and the positive electric charge at the portion from which the electron is released. Examples of such a metal oxide include rare earth-added zirconia having an oxygen defect, such as $La_xZr_{1-x}O_{(2-x/2)}$ (x=0.01 to 0.70), and alkaline earth-added zirconia having an oxygen defect, such as $Sr_xZr_{1-x}O_{(2-x)}$ (x=0.01 to 0.50).

As the support particle, a material having a high specific surface area and a fine form is suitably selected from alumina, silica, titania, zirconia, ceria and the like so as to provide a wide contact area with the exhaust gas.

In a preferred embodiment, an acidic support particle is added to the above-described support particle. Examples of the acidic support particle include $WO_3/ZrO_2$, alumina-silica, and zeolite. By this addition, the $NO_x$ purifying capability at low temperatures and the $SO_x$ desorbing property can be more improved. This is considered to occur because although the catalyst such as platinum originally exerts the catalytic activity in the acidic side as described above, an acidic condition is formed by the addition of the acidic support particle and moreover, $NO_x$ and $SO_x$ move fast on the acidic support.

Also, in a preferred embodiment, the support particles are formed by adding $WO_3/ZrO_2$ or the like to powder particles having a high specific surface area, such as γ-alumina. This is because γ-alumina having a high specific surface area is easily available but $WO_3/ZrO_2$ itself having a high specific surface area is difficult to obtain.

The $WO_3/ZrO_2$ is, as shown in Examples later, a particle obtained by depositing $WO_3$ on the surface of $ZrO_2$ particles.

The catalyst of the present invention comprising these catalyst component, support particles and $NO_x$ absorbent particles can be obtained by mixing the support particles and the $NO_x$ absorbent particles using a general method to form a slurry, coating the slurry on a monolith substrate, drying and calcining the slurry, then loading the catalyst component thereon, and drying and calcining it. The catalyst of the present invention can also be obtained by mixing the support particles having supported thereon the catalyst component with the $NO_x$ absorbent particles to form a slurry, coating the slurry on a monolith substrate, and drying and calcining the slurry.

The catalyst component can be loaded, for example, by deposition, precipitation, adsorption or ion exchange.

FIGS. 1 to 4 show some embodiments of the absorption reduction-type $NO_x$ purifying catalyst of the present invention together with the catalyst structure of a conventional technique.

FIG. 1 shows the state where a noble metal as the catalyst component is supported on γ-alumina as the support particles and the $NO_x$ absorbent particles are present as particles separate from the support particles.

Figure 2:
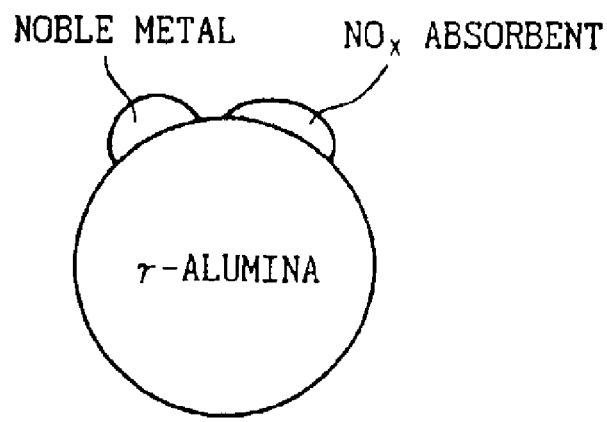
FIG. 2 is a model view showing the catalyst structure of a conventional technique.

FIG. 2 shows an absorption reduction-type $NO_x$ purifying catalyst of a conventional technique, where both the $NO_x$ absorbent and the noble metal as the catalyst component are supported on γ-alumina as the support particle.

Figure 3:
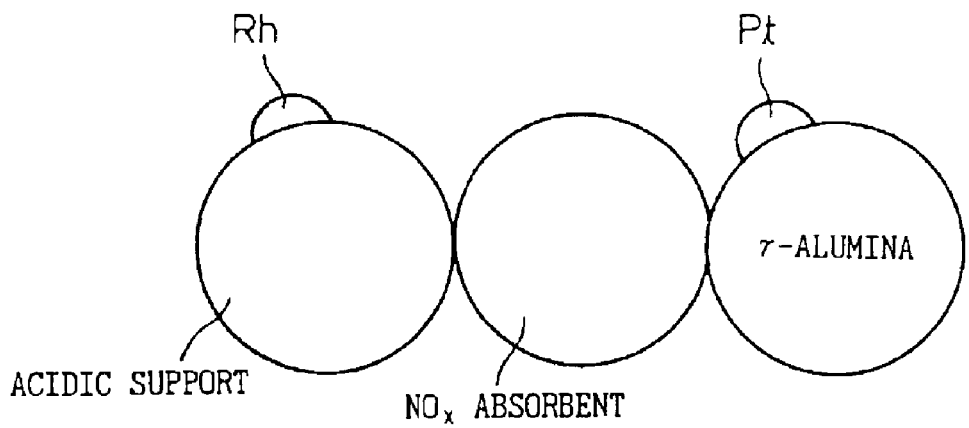
FIG. 3 is a model view showing another embodiment of the catalyst structure of the present invention.

FIG. 3 shows the state where platinum as the catalyst component is supported on γ-alumina as the support particles, rhodium is supported on an acidic support, and the $NO_x$ absorbent particles are present as particles separate from the support particles.

Figure 4:
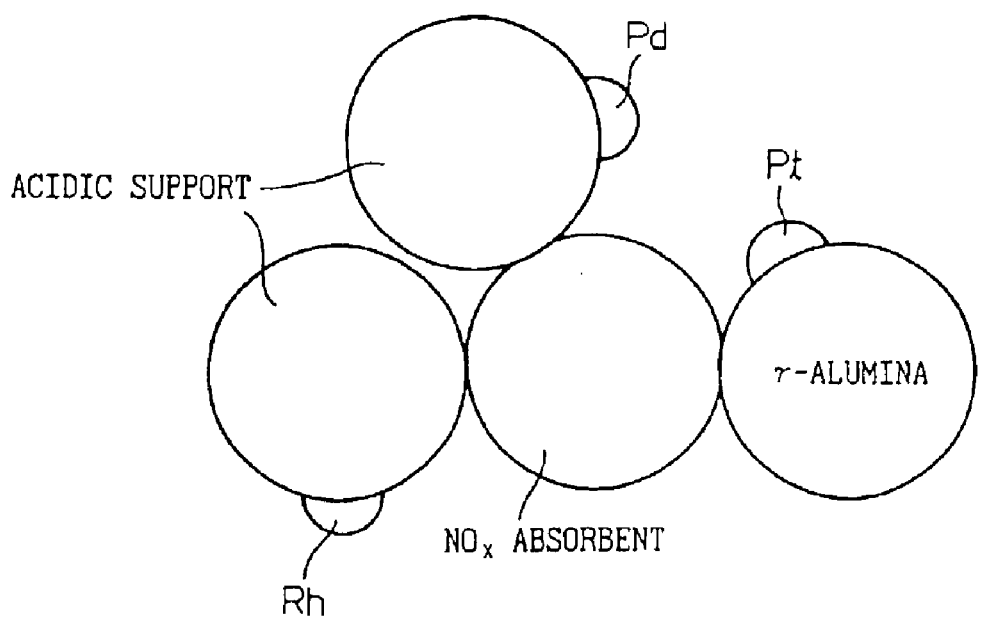
FIG. 4 is a model view showing another embodiment of the catalyst structure of the present invention.

FIG. 4 shows a state where, in the embodiment of FIG. 3, an acidic support having supported thereon palladium as the catalyst component is further mixed.

These Figures are only a schematic view for facilitating the understanding of the present invention, but the present invention is not limited thereto.

In the absorption reduction-type $NO_x$ purifying catalyst of the present invention, these constituent components are not particularly limited on the size, however, in terms of the average particle size as an average of longest diameter and shortest diameter (in the case of forming a physically fused aggregate, diameters of the aggregate), the size is, as a standard, from 0.5 to 5 μm, preferably from 0.5 to 2 μm for the carrier particle, and from 0.5 to 5 μm, preferably from 0.5 to 2 μm for the acidic support particle.

EXAMPLES

Example 1

20 Parts by mass of an aqueous lanthanum nitrate having a concentration of 20 mass % as lanthanum oxide was added to 100 parts by mass of zirconium hydroxide powder and mixed. The mixture was dried at 80° C. over night and then calcined at 650° C. for 2 hours to obtain a $La_xZr_{1-x}O_{(2-x/2)}$ (x=0.05) powder particles.

Then, 60 parts by mass of a solution having a concentration of 40 mass % as aluminum nitrate, 20 parts by mass of ceria powder and 200 parts by mass of water were added to 140 parts by mass of the $La_xZr_{1-x}O_{(2-x/2)}$ (x=0.05) powder prepared above and mixed in a ball mill over 8 hours to obtain a slurry.

This slurry was coated on a monolith substrate and, after preliminary calcination by drying, was calcined at 650° C. over one hour to form a layer containing $La_xZr_{1-x}O_{(2-x/2)}$ (x=0.05) powder particles and γ-alumina powder particles on the monolith substrate.

This layer formed was impregnated with an aqueous dinitrodiammine platinum solution, then dried and calcined at 500° C. for one hour, thereby loading platinum as the catalyst component.

Through such a procedure, a catalyst where 3 g of platinum, 100 g of $La_xZr_{1-x}O_{(2-x/2)}$ (x=0.05) powder particles and 75 g of γ-alumina powder particles were supported per 1 liter of the monolith substrate was obtained. This catalyst corresponds to the embodiment of FIG. 1.

Example 2

A catalyst where 2 g of platinum, 1 g of rhodium, 100 g of $La_xZr_{1-x}O_{(2-x/2)}$ (x=0.05) powder particles and 75 g of γ-alumina powder particles were supported per 1 liter of a monolith substrate was obtained in the same manner as in Example 1 except that the aqueous dinitrodiammine platinum solution of Example 1 was reduced to an amount corresponding to 2 g of platinum and hexaammine rhodium nitrate was added in an amount corresponding to 1 g of rhodium.

Example 3

A catalyst where 2 g of platinum, 1 g of palladium, 100 g of $La_xZr_{1-x}O_{(2-x/2)}$ (x=0.05) powder particles and 75 g of γ-alumina powder particles were supported per 1 liter of a monolith substrate was obtained in the same manner as in Example 2 except that the hexaammine rhodium nitrate in an amount corresponding to 1 g of rhodium of Example 2 was changed to palladium nitrate in an amount corresponding to 1 g of palladium.

Example 4

20 Parts by mass of an aqueous ammonium metatungstate solution having a concentration of 50 mass % was added to 91 parts by mass of zirconium hydroxide powder and mixed. The mixture was dried at 80° C. over night and then calcined at 650° C. for 2 hours to obtain $WO_3/ZrO_2$ powder particles as an acidic support where tungsten oxide was deposited on zirconium oxide.

Subsequently, a catalyst where 3 g of platinum, 100 g of $La_xZr_{1-x}O_{(2-x/2)}$ (x=0.05) powder particles, 75 g of γ-alumina powder particles and 100 g of $WO_3/ZrO_2$ powder particles were supported per 1 liter of a monolith substrate was obtained in the same manner as in Example 1 except that 100 parts by mass of $WO_3/ZrO_2$ powder particles prepared above and 75 parts by mass of γ-alumina powder particles were used in place of 100 parts by mass of γ-alumina powder particle of Example 1.

Example 5

A catalyst where 2 g of platinum, 1 g of rhodium, 100 g of $La_xZr_{1-x}O_{(2-x/2)}$ (x=0.05) powder particles, 75 g of γ-alumina powder particles and 100 g of $WO_3/ZrO_2$ powder particles were supported per 1 liter of a monolith substrate was obtained in the same manner as in Example 4 except that the aqueous dinitrodiammine platinum solution of Example 4 was reduced to an amount corresponding to 2 g of platinum and hexaammine rhodium nitrate was added in an amount corresponding to 1 g of rhodium.

Example 6

A catalyst where 2 g of platinum, 1 g of palladium, 100 g of $La_xZr_{1-x}O_{(2-x/2)}$ (x=0.05) powder particles, 75 g of γ-alumina powder particles and 100 g of $WO_3/ZrO_2$ powder particles were supported per 1 liter of a monolith substrate was obtained in the same manner as in Example 5 except that the hexaammine rhodium nitrate in an amount corresponding to 1 g of rhodium of Example 5 was changed to palladium nitrate in an amount corresponding to 1 g of palladium.

Example 7

A catalyst where 2 g of platinum, 0.5 g of rhodium, 0.5 g of palladium, 100 g of $La_xZr_{1-x}O_{(2-x/2)}$ (x=0.05) powder particles, 75 g of γ-alumina powder particles and 100 g of $WO_3/ZrO_2$ powder particles were supported per 1 liter of a monolith substrate was obtained in the same manner as in Example 5 except that the hexaammine rhodium nitrate in an amount corresponding to 1 g of rhodium of Example 5 was changed to hexaammine rhodium nitrate in an amount corresponding to 0.5 g of rhodium and palladium nitrate in an amount corresponding to 0.5 g of palladium.

Comparative Example 1

In Example 1, a layer containing γ-alumina powder particles was formed on a monolith substrate without containing $La_xZr_{1-x}O_{(2-x/2)}$ (x=0.05) powder particles. This layer was impregnated with an aqueous dinitrodiammine platinum solution, then dried and calcined at 500° C. for one hour, thereby loading platinum as the catalyst component.

Subsequently, the layer was further impregnated with an aqueous barium acetate solution and an aqueous potassium acetate solution, then dried and calcined at 500° C. for on hour to obtain a catalyst where 3 g of platinum, 0.2 mol of barium, 0.1 mol of potassium and 120 g of γ-alumina powder particle were supported per 1 liter of the monolith substrate. This catalyst corresponds to the embodiment of FIG. 2.

—$NO_x$ Absorption Percentage Test—

The catalyst obtained in Examples 1 to 7 and Comparative Example 1 each was measured on the $NO_x$ absorption percentage immediately after the preparation under the following conditions. The results obtained are shown in Table 1.

Exhaust gas: A/F=22

Exposure time: 1 minute

Gas space velocity: 50,000 $h^{-1}$

TABLE 1

NO$_x$ Absorption Percentage at Preparation
(for 1 minute in lean time)

| Noble Metal 2 g of Pt + | Acidic | NO$_x$ Absorption Percentage (%) | | |
|---|---|---|---|---|
| 1 g of Each | Support | 200° C. | 300° C. | 400° C. |
| Example 1 Pt | none | 56.5 | 96.7 | 86.4 |
| Example 2 Rh | none | 58.2 | 98.1 | 86.9 |
| Example 3 Pd | none | 86.5 | 96.7 | 86.7 |
| Example 4 Pt | WO$_3$/ZrO$_2$ | 58.1 | 96.2 | 77.0 |
| Example 5 Rh | WO$_3$/ZrO$_2$ | 60.1 | 98.2 | 79.1 |
| Example 6 Pd | WO$_3$/ZrO$_2$ | 85.4 | 97.5 | 80.5 |
| Example 7 Rh/Pd | WO$_3$/ZrO$_2$ | 88.2 | 98.1 | 81.5 |
| Comparative Example 1 Pt | none | 41.6 | 91.6 | 98.4 |

Furthermore, each catalyst was subjected to an endurance treatment under the following conditions and measured for the NO$_x$ absorption percentage after the endurance treatment in the same manner. The results obtained are shown in Table 2.

Exhaust gas: A/F was varied between 14 and 20 in a cycle of 30 seconds
Exhaust gas temperature: 850° C.
Exposure time: 100 hours
Gas space velocity: 100,000 h$^{-1}$

TABLE 2

NO$_x$ Absorption Percentage after Endurance Treatment
(for 1 minute in lean time)

| Noble Metal 2 g of Pt + | Acidic | NO$_x$ Absorption Percentage (%) | | |
|---|---|---|---|---|
| 1 g of Each | Support | 200° C. | 300° C. | 400° C. |
| Example 1 Pt | none | 47.1 | 86.4 | 63.5 |
| Example 2 Rh | none | 40.1 | 78.4 | 64.3 |
| Example 3 Pd | none | 35.6 | 76.5 | 64.2 |
| Example 4 Pt | WO$_3$/ZrO$_2$ | 54.1 | 92.3 | 67.4 |
| Example 5 Rh | WO$_3$/ZrO$_2$ | 53.1 | 93.5 | 70.1 |
| Example 6 Pd | WO$_3$/ZrO$_2$ | 79.1 | 94.5 | 74.5 |
| Example 7 Rh/Pd | WO$_3$/ZrO$_2$ | 95.2 | 96.6 | 78.0 |
| Comparative Example 1 Pr | none | 15.2 | 78.1 | 54.1 |

It is seen from the results shown in Table 1 that when the absorbent comprising an alkali metal or alkaline earth metal is replaced by an absorbent comprising La$_x$Zr$_{1-x}$O$_{(2-x/2)}$ powder particles (Examples 1 to 3), the NO$_x$ absorption percentage, particularly at low temperature of 200° C., is increased. Furthermore, when WO$_3$/ZrO$_2$ powder particles which are an acidic support is contained (Examples 4 to 7), the NO$_x$ absorption percentage is more increased.

Also, it is seen from the results shown in Table 2 that the improvement of the NO$_x$ absorption percentage at low temperatures is maintained even after the endurance heat treatment as compared with conventional catalysts and this effect is more enhanced by containing an acidic support.

—NO Oxidizing Capability Test—

Figure 5:
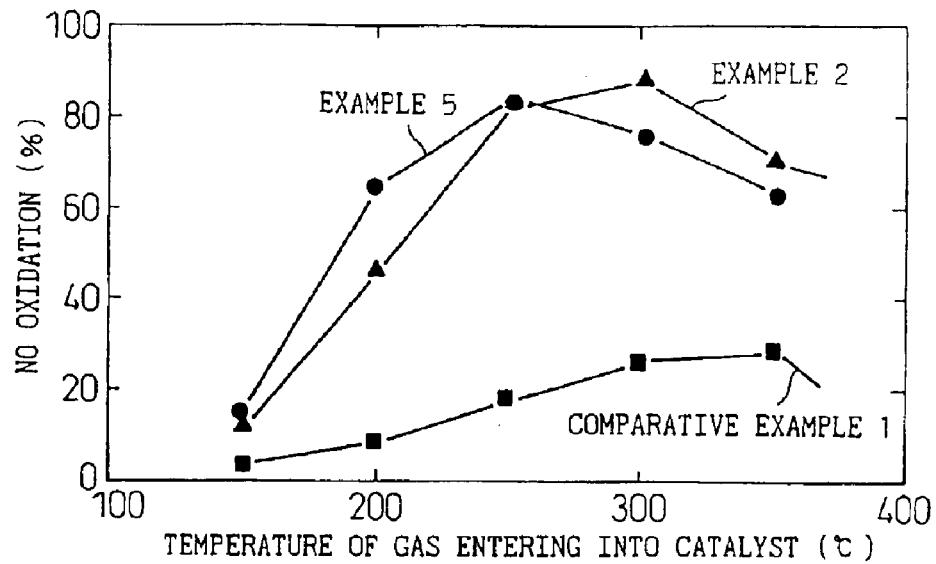
FIG. 5 is a graph comparing the NO oxidizing capability of catalysts.

The catalysts of Examples 2 and 5 and Comparative Example 1 were each exposed to an exhaust gas at 800° C. having a theoretical air-fuel ratio (A/F=14) for 50 hours. Thereafter, an exhaust gas was introduced under the following conditions and the percentage of NO oxidized into NO$_x$ was measured by varying the temperature of exhaust gas entering into the catalyst. FIG. 5 shows the results.

Gas composition: 250 ppm of NO+6% of O$_2$+10% of CO$_2$+8% of H$_2$O (balance: nitrogen)
Gas space velocity: 50,000 h$^{-1}$ It is seen from the results shown in FIG. 5 that the catalyst of the present invention is greatly increased in the NO oxidization percentage at low temperatures. This increase of the NO oxidation percentage is understood to correspond to the increase of the NO$_x$ absorption percentage in Table 1.

The reason therefor is considered as follows. The comparative catalyst is suppressed in the catalytic activity because the NO$_x$ absorbing component and the catalyst component are supported on the same support, whereas in the present invention, the NO$_x$ absorbing component is separated from the support having thereon the catalyst component and therefore, the catalytic activity is not suppressed.

—SO$_x$ Desorption Test—

The catalysts of Examples 2 and 5 and Comparative Example 1 each was subjected to a sulfur poisoning treatment by elevating the temperature to 250 to 550° C. for 30 minutes in an atmosphere of gas having the following composition.

Figure 6:
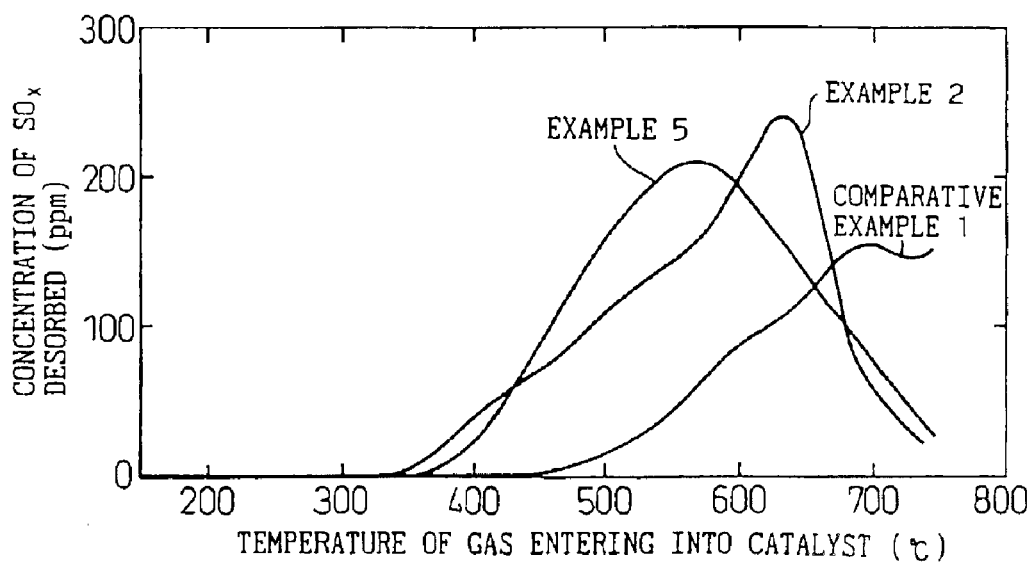
FIG. 6 is a graph comparing the $SO_x$ desorbing property of catalysts.

Gas composition: 100 ppm of SO$_2$+150 ppm of CO+670 ppm of C$_3$H$_6$+250 ppm of NO+10% of O$_{2+6.5}$% of CO$_2$+3% of H$_2$O (balance: nitrogen)
Gas space velocity: 100,000 h$^{-1}$ Then, the catalyst having adsorbed thereto SO$_x$ by this treatment was heated to a temperature between 150° C. and 750° C. at 20° C./min in an exhaust gas atmosphere of A/F=14 and the concentration of SO$_x$ desorbed was measured. FIG. 6 shows the results.

It is seen from the results shown in FIG. 6 that, in the catalyst of the present invention, the SO$_x$ desorbing temperature was greatly shifted to the low-temperature side.

The reason therefor is considered to be as follows. In the conventional catalyst, the NO$_x$ absorbing component and the catalyst component are supported on the same support and the activity of the catalyst component is thereby suppressed. Furthermore, potassium and barium having high reactivity of forming a nitrate are used as the NO$_x$ absorbent and therefore, the formation of a sulfate proceeds inside the NO$_x$ absorbent, as a result, the SO$_x$ desorption is worsened.

On the other hand, in the present invention, the catalyst component is not suppressed in the activity because the NO$_x$ absorbing component is separated from the support having thereon the catalyst component, and moreover, the bonding between SO$_x$ and the NO$_x$ absorbent is relatively weak.

It is also seen that, in the case of adding an acidic support (Example 5) to the support, the activity of the acidic support contributes to the SO$_x$ desorption in the low-temperature side.

This is considered to be because an acidic condition is formed for the catalyst component, and NO$_x$ and SO$_x$ move quickly on an acidic support.

INDUSTRIAL APPLICABILITY

As described in the foregoing pages, the catalyst of the present invention is enhanced in the NO$_x$ purifying capability at low temperatures and improved in the SO$_x$ desorbing property. Accordingly, a catalyst enlarged in the temperature range where a high three-way performance can be exerted, and suitable for the purification of a diesel exhaust gas, can be provided.

What is claimed is:

1. An absorption reduction-type NO$_x$ purifying catalyst comprising a NO$_x$ absorbent particle, a support particle having supported thereon a catalyst component comprising a noble metal, and an acidic support particle, wherein the catalyst component comprising a noble metal is not supported on the NO$_x$ absorbent particle.

2. The absorption reduction-type NO$_x$ purifying catalyst as claimed in claim 1, wherein said NO$_x$ absorbent particles are a metal oxide having a base point for donating an electron.

3. The absorption reduction-type $NO_x$ purifying catalyst as claimed in claim 2, wherein said metal oxide is rare earth-added zirconia or alkaline earth-added zirconia.

4. The absorption reduction-type $NO_x$ purifying catalyst as claimed in claim 1, wherein said $NO_x$ absorbent particle is rare earth-added zirconia of formula (1) below:

  (1)

wherein M is rare earth metal; and x is from 0.01 to 0.70; or alkaline earth-added zirconia of formula (2) below:

  (2)

wherein N is alkaline earth metal; and x is from 0.01 to 0.50.

5. The absorption reduction-type $NO_x$ purifying catalyst as claimed in claim 4, wherein the support particle comprises alumina, silica, titania, zirconia or ceria.

6. The absorption reduction-type $NO_x$ purifying catalyst as claimed in claim 5, wherein the support particle comprises γ-alumina.

7. The absorption reduction-type $NO_x$ purifying catalyst as claimed in claim 1, wherein the acidic support particle comprises $WO_3/ZrO_2$, alumina-silica or zeolite.

* * * * *